UNITED STATES PATENT OFFICE.

AARON VAN CAMP, OF WASHINGTON, DISTRICT OF COLUMBIA.

IMPROVEMENT IN ASPHALTIC AND CRUSHED-ROCK PAVEMENTS.

Specification forming part of Letters Patent No. 120,914, dated November 14, 1871.

*To all whom it may concern:*

Be it known that I, AARON VAN CAMP, of Washington, District of Columbia, have made a new and useful Improvement in Asphaltic Pavements; and I hereby declare the following to be a full description of the same.

This invention consists in forming a pavement, as hereinafter described, of crushed and pulverized rock or stone, sesquioxide or red oxide of iron, and asphaltum or bitumen.

The following description will enable any one skilled in the art to make and use my invention.

Take of sesquioxide or red oxide of iron from two and a half to four per cent., and heat it to about 220° Fahrenheit, and add it gradually to the melted asphalt, stirring the latter vigorously while doing so. When thoroughly incorporated add to the mixture five per cent. of finely-pulverized carbonate of lime or any lime in impalpable powder, also heated to about 220° Fahrenheit, stirring the mixture until these three ingredients are perfectly incorporated. Then, having the crushed and pulverized stone or rock properly heated, apply the mixture to it and stir it thoroughly until the stone or rock is fully incorporated with the asphaltic mixture. The compound is then taken out and laid down and spread on the street, and by means of hot and cold rollers compacted to the desired solidity to form a durable and smooth pavement.

By means of oxide of iron or oxidized-iron clay I form a firm and durable cement to hold the pieces of crushed and pulverized rock, so that it shall resist the wear of the traffic of the most-frequented streets, where the loads are heavy and the wear such that no ordinary material will stand; but this material, being very hard and elastic, will serve that purpose. This preparation makes the hardest and most desirable pavement, and one of exceeding durability. I also use the red oxide of iron or Spanish brown to tone the black color of the asphalt in other preparations of that material.

Oxide of iron is very abundant in many parts of the country, particularly in northern Indiana and Wisconsin, in the form of hydrated oxide of iron; also in Kentucky and Tennessee, forming the red lands of those States. This oxide is used extensively in the West by the artificial-stone manufacturers in the production of red and brown stone.

This prepared asphalt is also applicable to concretes fabricated from gravel and sand with the addition of the oxidized or red-iron clay mixed in proportion of about ten per cent., with sand and gravel properly heated, mixed, and laid down similar to the crushed and pulverized rock or stone before mentioned.

I have given what I consider the best proportions; but I do not limit myself to these, as they may be varied without departing from the nature of my invention.

Having thus described my invention, what I claim, and desire to secure by Letters Patent of the United States, is—

The improved asphaltic pavement herein described, made by combining crushed and pulverized rock or stone, asphaltum, and red oxide of iron or iron-clay, with or without the addition of other materials such as herein named.

In testimony whereof I have signed my name to this specification in the presence of two subscribing witnesses.

AARON VAN CAMP.

Witnesses:
   T. C. CONNOLLY,
   THOS. S. MERCER.